United States Patent
Tognazzini et al.

[11] Patent Number: 5,886,683
[45] Date of Patent: Mar. 23, 1999

[54] METHOD AND APPARATUS FOR EYETRACK-DRIVEN INFORMATION RETRIEVAL

[75] Inventors: Bruce Tognazzini, Woodside; Jakob Nielsen, Atherton; Robert Glass, Los Gatos, all of Calif.

[73] Assignee: Sun Microsystems, Inc., Palo Alto, Calif.

[21] Appl. No.: 673,695

[22] Filed: Jun. 25, 1996

[51] Int. Cl.$^6$ .................................................... G09G 5/08

[52] U.S. Cl. ............................... 345/146; 345/8; 345/157

[58] Field of Search ........................... 345/146, 7–9, 345/156, 145, 157, 158, 352, 353; 395/352–353; 351/209, 210

[56] References Cited

U.S. PATENT DOCUMENTS

| | | | |
|---|---|---|---|
| 4,896,291 | 1/1990 | Gest et al. ................................ | 345/146 |
| 4,973,149 | 11/1990 | Hutchinson . | |
| 4,984,179 | 1/1991 | Waldern ...................................... | 345/8 |
| 5,169,342 | 12/1992 | Steele et al. ............................. | 345/146 |
| 5,333,147 | 7/1994 | Nohara et al. ........................... | 371/5.1 |
| 5,396,264 | 3/1995 | Falcone et al. .......................... | 345/146 |
| 5,537,132 | 7/1996 | Teraoka et al. .......................... | 345/146 |
| 5,552,806 | 9/1996 | Lenchik .................................... | 345/156 |

FOREIGN PATENT DOCUMENTS

| | | | |
|---|---|---|---|
| 4-67093 | 3/1992 | Japan ..................................... | 345/127 |

OTHER PUBLICATIONS

"Instant HTML Web Pages", by Wayne Ause, 1995, Ziff–Davis Press, Chapter 1, pp. 1–15.

"Noncommand USer Interfaces", by Jakob Nielsen, Communications of the ACM, Apr. 1993, vol. 36, No. 4, pp. 83–99.

"Eye Controlled Media: Present and Future State", http://www.diku.dk/npanic/eyegaze/, by Arne John Glenstrup and Theo Engell–Nielsen, University of Copenhangen, Jun. 1, 1996, 16 Pages.

"The Eyegaze Eyetracking System Unique Example of a Multiple–Use Technology", by Joseph A. Lahound and Dixon Cleveland, LC Technologies, Inc., 4th Annual 1994 Dual–USe Technologies and applications Conference, May 23–24, 1994, 1994, 6 Pages.

"The Eyegaze Eyetracking System", by Dixon Cleveland and Nancy Cleveland, LC Technologies, Inc., Imagina Images Beyond Imagination Eleventh Monte–Carlo International Forum on New Images, Jan. 29–31, 1992, 8 Pages.

"Fourward Eyetrack", Warren Ward, Fourward Technologies, 2 Pages, undated.

*Primary Examiner*—Regina Liang
*Attorney, Agent, or Firm*—McDermott, Will & Emery

[57] ABSTRACT

Apparatus, methods, systems and computer program products are disclosed that determines what information presented on a computer display screen to a user most interests the user. The invention uses this information to correlate the topics of the displayed information and the user's interest to select additional information for the user. This additional information better matching the user's interest.

20 Claims, 17 Drawing Sheets

A modern phone. Available in white, black, beige, and hot blue. This two line phone sells for $29.95 and is available for a limited time. Model number BZ14392. Order number 123-333.

1621

Advertisment directed to scientific readership

Major Scientific Headline

Space Chemistry

This story is about the differences between how some reactions operate in a gravity free field (in orbit) as compared to how the reactions ocure in a gravity field (on earth). It continues and continues and continues.

More detail about the new chemical reaction has described above

Laser Fusion

This story is about the lthe status of laser fusion research. It goes into significant detail as to the participants, the amount of money spent on the research and other details.

The story continues on in this manner until it

Cosmos

This article is about the age of the universe. It contains information about the latest data acquired from the Hubble space telescope and discusses problems with estimates of the age of the universe including the amount of dark matter.

Quarks and SU[4]

This stoy describes some of the mathmatics used to describe Quarks. Current Scientific thought about Quarks, Strings, and other rather detailed information about elementary partical physics.

The article continues providing some experimental

*Fig. 16*

METHOD AND APPARATUS FOR EYETRACK-DRIVEN INFORMATION RETRIEVAL

BACKGROUND OF THE INVENTION

FIELD OF THE INVENTION

This invention relates generally to the field of computer-human user interface technology and more particularly to a method, apparatus, system and computer program product for allowing a computer to automatically determine what aspect of the computer's operation has the user's interest and to optimize that aspect.

BACKGROUND

Human/Computer Interaction

An important characteristic of modern computing systems is the interface between the human user and the computer. Early interactive interfaces were text based wherein a user communicated with the computer by typing a sequence of characters on a keyboard and the computer communicated with the user by displaying characters on an output device—commonly a display screen. These input characters specified a command to the computer's operating system or to an application program executing on the computer. This command invoked program logic to perform a given operation. Modern computer systems use a graphical user interface (GUI) to simplify the interaction between a user and a computer. A GUI equipped computer communicates with a user by displaying graphics, including text and icons, on a display screen and the user communicates with the machine both by typing in textual information in response to dialogs and by manipulating the displayed icons with a pointing device, such as a mouse.

Many modern GUIs provide a window environment. In a typical window environment the graphical display portrayed on the display screen is arranged to resemble the surface of an electronic "desktop" and each application program running on the computer is represented as one or more electronic "paper sheets" displayed as rectangular regions on the display screen. These rectangular regions are called "windows". Each window may include a multitude of panes. Each pane being an area for a particular type of information (textual, still image, moving image, etc.).

Each window displays information generated by an associated application or system program. Further, there may be several windows simultaneously present on the desktop with each containing information generated by a program. A program presents information to the user through each window by drawing or "painting" images, graphics or text within the window. The user can also move a window to a different location on the display screen and change its size and appearance to arrange the desktop in a convenient manner. The user communicates with the program by "pointing at" objects displayed in the window with a cursor controlled by a pointing device and manipulating the objects as desired. In some cases the program requests additional information from the user in response to a manipulation. This request is presented as a "dialog" that allows the user to provide the requested information to the dialog from the keyboard.

Each window typically includes a number of standard graphical objects such as sizing boxes, buttons and scroll bars. These features represent user interface controls that the user can manipulate with the pointing device. When the controls are selected or manipulated, the GUI invokes program logic in the underlying program to effect a corresponding command.

One characteristic of a GUI is that the GUI is only responsive to a user's explicit manipulation of the pointing device or keyboard. In the case of a mouse, the user physically moves the mouse device and a cursor on the display moves accordingly. Some pointing devices actually track the user's gaze and move the cursor to where the user "looks" on the display screen. However, even with the gaze tracking (eye tracking) devices, the GUI only responds to the user's explicit commands whether that command be a button press, a blink, or a shift of view. The computer remains a tool that the user operates by issuing explicit commands.

In contrast, humans have the ability to make inferences by looking at another human's eyes. Pupils dilate when people see something attractive. People look at what they are interested in and stare at things they find interesting. Also, human eye movements reflect thought processes. Thus, humans observe what other persons do with their eyes and make inferences as to what that other person is interested in and/or thinking.

The prior art in computer-human interfaces does not determine the user's immediate interest. Prior art computer-human interfaces simply respond to a user's command, whether input by typing the command at a keyboard, by manipulating a mouse to move a cursor, or by using a gaze tracking device to move a cursor. Thus, the computer is unable to detect or anticipate what characteristic of the computer's operation is of most interest to the user at any given time.

Gaze Tracking Devices

Most gaze tracking devices operate based upon the principal that the direction of a person's gaze is directly related to the relative positions of the pupil and the reflection of an object off the cornea (gaze tracking is often termed eye tracking). These devices often include image processing capabilities that operate on a video image of an eye to determine the gaze direction of the eye. These image processing capabilities are enhanced by using the bright eye affect.

The bright eye affect is a result of the highly reflective nature of the retina. This characteristic of the retina means that a significant amount of the light that enters an eye is reflected back through the pupil. Thus, when light shines into an eye along the axis of a camera lens, the retina reflects a significant portion of the light back to the camera. Hence, the pupil appears as a bright disk to the camera. This affect allows the pupil to be more readily imaged from a video of an eye.

Other methods exist for gaze tracking. Some incorporate having two video cameras, one for tracking head movement and the other for measuring a reflection off of the eyes. Other mechanisms involve measuring electric potential differences between locations on different sides of an eye. High accuracy devices are very intrusive on the user and require that the user's head be held in a fixed position or that the user wear special equipment to track the eye.

Recently, an eyegaze eyetracking system has been developed as described in *The Eyegaze Eyetracking System— Unique Example of a Multiple-Use Technology*, 4th Annual 1994 IEEE Dual-Use Technologies and Applications Conference, May, 1994. This system comprises a video camera located below a computer display that monitors one of the user's eyes. The device also contains an infrared light emitting diode (LED) located at the center of the camera's lens to maximize the bright-eye affect. Image processing software on the computer computes the user's gazepoint on the display sixty times a second with an accuracy of about a quarter inch.

Gaze tracking devices have been used for weapon control, operator training, usability analysis, market research, and as an enablement for the disabled. However, gaze tracking devices have not been used to determine what characteristic of a computer's operation interests the computer user at a particular time or to allow the computer to adapt to a user's interest as demonstrated by where on the display screen the user is looking.

Text to Speech

Many modern computers now provide text-to-speech capability. This capability processes text strings and produces understandable audio speech from the computer's audio output device (headphones or speaker). This capability allows a computer to present an audio version of a text string to a computer user.

Problems with Downloading Information

The background of the World Wide Web (WWW) and WWW browsers are well described by reference to the first chapter of Instant HTML Web Pages, by Wayne Ause, Ziff-Davis Press, ISBN 1-56276-363-6, Copyright 1995, pages 1–15, hereby incorporated by reference as illustrative of the prior art.

Using the Internet, a computer user has access to an immense amount of information. However, retrieving this information over the Internet often takes significant time because of the limited bandwidth of the communication channel. The bandwidth is limited by many factors. Some of these factors are the bandwidth of the communication link from the user's computer to the Internet, the bandwidth of the communication link from the information provider's computer to the Internet, the existence of other communication traffic on these links, and the bandwidth of the Internet itself. Often, the primary bandwidth limitation is at the user's computer.

This bandwidth limitation at the user's computer is exacerbated because multiple data streams often flow across this limited communication link. If the user is interested in a particular data transfer, these additional data streams utilize bandwidth that would otherwise be available to the data stream-of-interest to the user. This results in a decreased data transfer rate of the data stream-of-interest.

Prior art WWW browsers, for example, generally attempt to equally allocate bandwidth to all the data transfers directed towards visible views in a window. Although this approach is clearly better then simply sequentially retrieving data for each view, this approach delays retrieving data that is of the most interest to the user because the available channel bandwidth is divided between the data streams supplying data to the views. Thus, the user must wait an additional time because of uninteresting information using bandwidth that could have been applied to the information of interest.

During the transmission of large amounts of data, a program generally provides some indication of the progress of the transmission. This indication is provided by indicators such as bar indicators, numerical percentage indicators, or in the case of images often just the amount of detail available in the displayed image. While waiting for the transfer to complete, the user often watches the progress of the indicator or of the partially-filled image.

As mentioned above, one problem with the prior art is that a user has little control over the bandwidth allocated to the data stream used to download information. Further, even if an application should provide this control to the user, the user still must explicitly command the application to set the allocated bandwidth.

The invention addresses these problems.

Problems with Additional Data Associated with Images

In print and computer hypertext documents, images such as pictures and illustrations, are often provided with additional information, such as captions explaining or enhancing the image. Those who view the image cannot look at the image and read an associated caption at the same time. Thus, the viewer's attention is diverted from the image while searching for, and reading, the associated caption. Contrast this situation with a directive time-dependent medium, such as film or video, where a viewer is simultaneously presented with both visual and audio information. Audio captioning presents additional information though an audio speaker allowing the user to receive additional information auditorally without distracting the viewer's gaze from the image of interest. Systems that allow a user to select which image to view, from a plurality of images, require the user to explicitly trigger the vocal caption. Thus, the user is again distracted from looking at the image by the need to seek out and activate the caption.

The invention addresses these problems.

Problems with Small Text Displayed to a User

People often have difficulty reading text on a computer display screen. Often this is due to vision difficulties. Thus, the type used in WYSIWYG (what you see is what you get) applications is often too small for comfortable reading at the display distance. Further, publishers use different type sizes as a layout tool that indicates importance. Thus, there is a large variation in text size and screen space used between the largest headline text and the text of an article. To address this problem, some applications allow the WYSIWYG text to be magnified. Examples of word processing programs that provide this capability are Microsoft's Word® and Adobe's FrameMaker® programs. However, these programs require the user to explicitly specify, either directly or indirectly, the desired magnification factor. Further, the magnification process reduces the amount of the page that can be displayed on the computer display at the same time because the percentage of the page that is displayed to the user is reduced when the page is magnified. This problem is exacerbated with applications that display WYSIWYG versions of newspapers and magazines because these applications generally attempt to maintain the WYSIWYG page layout and the displayed page is uniformly magnified. To see the entire page, the article text is generally reduced to unreadable size.

The page layout of newspapers and magazines is important. To attract the interest of a large number of readers, the publishers of newspapers present a large number of articles on the first few pages. One way to increase the number of articles on a page is to decrease the amount of space used for the article. In a traditional newspaper, this is accomplished by moving subsequent parts of the article to different pages. This allows the reader to quickly scan articles that the editor believes to be most relevant and to read in depth those articles that the reader finds interesting. Further, where articles are placed on a page influences the order that articles are viewed. Electronic newspapers have these same characteristics.

Additionally, electronic newspapers, like traditional newspapers, use different type styles and sizes to indicate the relative importance of headlines and subheaders. Thus, there is a wide disparity between the largest and smallest text displayed to the reader. Moreover, even large computer displays have a smaller display area than is available to a traditional newspaper thus reducing the area available to the publisher for articles.

Nevertheless, a computer display must often carry the same amount of information as a newspaper. Thus, mapping the content of a newspaper onto a display screen reduces the size of the type used for the articles to the point where the text of the article is extremely difficult to read. Further, the magnification method used by word processing programs for a globally expanding the displayed text does not work well when presenting many articles on a page because magnifying the entire page, and providing a limited view into the page distances the structure of the page from the viewer. Thus, globally expanding the text is incompatible with presenting as many articles as is desired on the page. Further, globally expanding the page also expands the larger title and headline text more than is needed to make this text readable and at a cost of consuming undue display space that could otherwise be used to present additional information. Thus, there is a need for a mechanism that optimizes the text size for a reader while still preserving the structural indications provided by the page layout.

The invention addresses these problems.

Problems with Selecting Relevant Information for a User

Another aspect of electronic newspapers, briefly mentioned above, is that of selecting information content for the newspaper. Information content includes both articles about particular items of interest and advertising information. Information content is a major reason why people select different paper-based magazines and newspapers. These traditional information providers present the information that they believe interest their readers. Traditional newspapers and magazines are static once printed. Thus, each edition is the same for all those who read it and each copy of a particular edition distributed to a particular region has the same articles, the same layout and the same advertising as all the other copies distributed to the region. This advertising and information content can be customized to the particular region. However, this regionalization can only be carried so far as it is extremely expensive to customize a newspaper or magazine to the particular individual interests of each reader. Thus, some of the information selected for a region will not interest some readers.

Intangible electronic newspapers need not be constrained by the above mentioned limitations inherent in using a tangible paper medium. However, electronic newspapers still target most advertising and information content to a particular market and not to the particular interests of an individual reader. Even where the reader of an electronic publication is provided with a means to customize the content of the electronic paper the user must explicitly specify the content. Further, by explicitly specifying the content, the user may not as be presented with other related information that falls just outside of the specification but that could be of interest to the reader.

The invention addresses these problems.

SUMMARY OF THE INVENTION

The present invention provides an economical, apparatus, method, system and computer program product for providing enhanced facilities to computer users. This invention provides a way for a computer to monitor the user to determine what aspect of the computer operation the user is interested in and to respond accordingly.

One aspect of the invention is a computer controlled method for presenting information to a user of a computer. The method makes use of a display device and a gaze-tracking device. The gaze-tracking device determines the user's gaze position on the display device. The first step of the method displays a plurality of categorized information on the display device. It then monitors the gaze position to determine the user's level of interest in the plurality of categorized information displayed on the display device. The invention also retrieves one or more topics that classify the plurality of categorized information. Using these topics and the level of interest the invention determines a correlation that is used to select a new plurality of categorized information.

Another aspect of the invention discloses an information presentation apparatus that presents information on a display device to a user. This apparatus includes a central processor unit, a memory and a gaze-tracking device. The gaze-tracking device determines a gaze position on the display device. The apparatus also includes a display mechanism that displays a plurality of categorized information on the display device. Additionally the apparatus uses a monitoring mechanism to monitor the gaze position to determine the user's level of interest in the plurality of categorized information presented on the display device. The apparatus also includes a retrieval mechanism that retrieves topics that classify the categorized information displayed on the display device. These topics and the level of interest of the user are provided to a correlation mechanism that determines a correlation between the topics and level of interest. Lastly, the apparatus includes a selection mechanism that selects a new plurality of categorized information based on the correlation.

Yet another aspect of the invention is an information presentation system that presents information on a display device to a user. This system includes a gaze-tracking device. The gaze-tracking device determines a gaze position on the display device. The system also includes a display mechanism that displays a plurality of categorized information on the display device. Additionally the system uses a monitoring mechanism to monitor the gaze position to determine the user's level of interest in the plurality of categorized information presented on the display device. The system also includes a retrieval mechanism that retrieves topics that classify the categorized information displayed on the display device. These topics and the level of interest of said user are provided to a correlation mechanism that determines a correlation between the topics and level of interest. Lastly, the system includes a selection mechanism that selects a new plurality of categorized information based on the correlation.

A final aspect of the invention discloses a computer program product having computer readable code embodied in a computer usable storage medium. When executed on a computer, the computer readable code causes a computer to effect a display mechanism to display a plurality of categorized information on a display device. Further the invention contains code that effects a monitoring mechanism, a retrieval mechanism, a correlation mechanism and a selection mechanism having the same functions as the system described above.

The foregoing and many other objects and advantages of the present invention will no doubt become obvious to those of ordinary skill in the art after having read the following detailed description of the preferred embodiments which are illustrated in the various drawing figures.

DESCRIPTION OF THE DRAWINGS

FIG. 16 illustrates a possible second page of an electronic newspaper showing information determined to be of interest to the reader in accordance with a preferred embodiment.

DESCRIPTION OF THE PREFERRED EMBODIMENTS

Notations and Nomenclature

Figure 1:
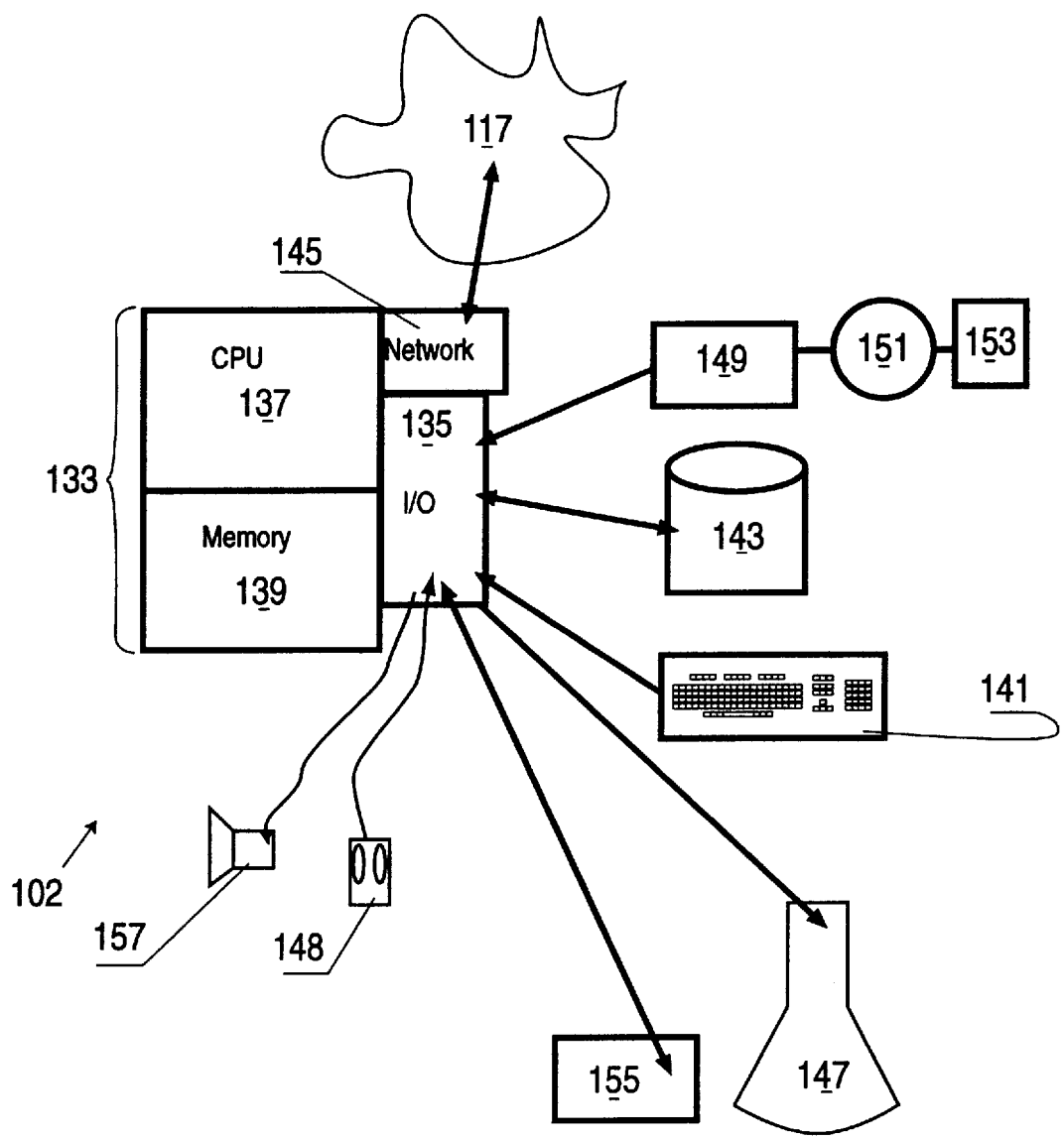
FIG. 1 illustrates a portion of a computer system, including a CPU and a conventional memory in which the present invention may be embodied.

The following "notations and nomenclature" are provided to assist in the understanding of the present invention and the preferred embodiments thereof.

Advertisement—Information provided about a commercial product or service with the purpose of informing the viewer about the product or service so as to lead to a commercial transaction. A type of article.

Article—A complete piece of writing often identified with a title.

Bandwidth—The amount of information that can be passed across a communication channel in a given period of time (usually designated in reference to a second).

Dialog—A specialized window that is used to obtain additional information from the user. A dialog is often used to obtain options and parameters that are computer dependent. A good example is a print dialog that is evoked by a print menu command. The print dialog allows the user to specify what printer options are to be used for a particular print job. Generally the dialog allows the user to specify specific parameters and then to either affirm or cancel the command that evoked the dialog. If the user cancels the command, the dialog window is removed and the command that evoked the dialog is aborted. If the user confirms the command the user provided information acquired by the dialog is used in the execution of the command that evoked the dialog.

E-mail system—Electronic mail system. A system of computers generally connected by a network that allow a sender (being a user of a first computer) to compose and send data making up a message to a recipient (being a user of either the first computer or of a second computer).

Graphical User Interface (GUI)—A user interface that allows a user to interact with a computer display by pointing at selectable control areas on the display and activating a command or computer operation associated with the selectable control area. GUIs are well known in the art.

Gaze position—An area of interest on the screen providing a boundary of the user's gaze over a limited period of time.

Gaze coordinates—The coordinates that represent the intersection of the user's gaze with the display screen over a limited period of time.

Gaze coordinates (raw)—The coordinates that represent the instantaneous intersection of the user's gaze with the display screen.

Image—Any information displayed on a display screen such as, but not limited to, pictures, drawings, illustrations, text, and video. An image generally displayed in a view contained in a window. A still image is a picture. A moving image is comprised of a number of frames of still images that are played in sequence similar to a video Pointing device—A device responsive to a computer user's input that moves an indicator on a computer display screen. Such an indicator has an active point such that if the pointing device is activated (e.g., by a button push for a mouse device) a command associated with the selectable control area covered by the active point is invoked. Pointing devices are generally used with graphical user interfaces.

Selectable control area—An area on a computer display that is sensitive to activation of a pointing device. On activation of the pointing device over the selectable control area, a command or computer operation associated with the selectable control area is invoked. Most computer systems that provide a Graphical User Interface (GUI) also provide other methods for invoking these commands or computer operations such as keyboard function keys or command lines.

URL—A Uniform Resource Locator. URLs are used to access information on the World Wide Web.

View—An area in a window where information is provided.

Window—An area, usually rectangular, on a computer display screen controlled by an application.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

FIG. 1 illustrates a computer system referenced to by the general reference character 102, configured to support the invention. The system 102 includes a processor 133 having an Input/Output ("I/O") section 135, a central processing unit ("CPU") 137 and a memory section 139. The I/O section 135 is connected to a keyboard 141, a disk storage unit 143, a network interface 145 to provide access to a network 117, a display unit 147, a pointing device 148, a gaze-tracker device 155, a speaker 157 and a CD-ROM drive unit 149. The CD-ROM unit 149 can read a CD-ROM medium 151 that typically contains a plurality of programs 153 and data. The CD-ROM 149 and the disk storage unit 143 comprising a filestorage mechanism. One skilled in the art will understand that the filestorage mechanism may comprise read only memory, RAM or other storage technology that allows a computer to access data. Such a computer system is capable of executing programmed logic that embodies the invention.

Gaze Tracker Operation

Figure 2:
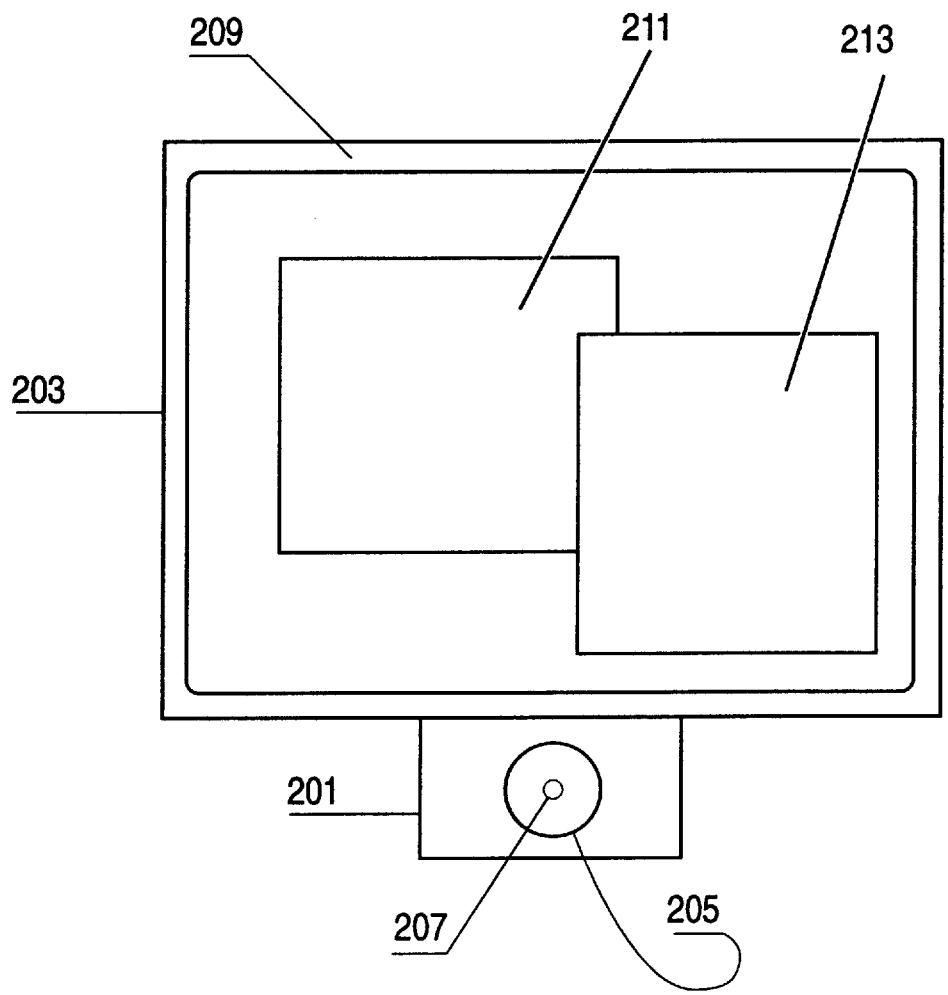
FIG. 2 illustrates a display device fitted with gaze tracking equipment.

FIG. 2 illustrates a gaze tracking device 201 attached to a computer display device 203. As illustrated, the gaze tracking device 201 is mounted below the computer display 203 and comprises a video lens 205, with an infrared LED 207 mounted on the center of the lens 205. One skilled in the art will understand that one of many different types of gaze tracking devices can be used with the invention. The computer display device 203 has a display area 209 that the computer can access to display information. The computer generally creates a plurality of windows 211 and 213 for this informational display. As the user looks at the display area 209, the gaze tracking device determines the users gaze position. The gaze coordinate (raw) is an ordered pair of values providing the immediate two dimensional coordinates of where the user's gaze is positioned on the screen. A number of gaze coordinates can be used to develop a gaze position that is a two dimensional coordinate of a time weighted average of the gaze coordinates. The invention need not have precise gaze coordinates. In fact the gaze coordinates need only be accurate to approximately a ¼ inch. One skilled in the art will understand that the gaze position could also be returned as a rectangle, polygon, circle or other shape representing an area of interest. Further one skilled in the art will understand that the gaze tracking device 201 may be configured to provide the gaze position only when the user has shown interest in a displayed area for a sufficient time, or that application or system program logic may be utilized to detect when the user has shown an interest by monitoring the gaze coordinates over some period of time. The gaze position is developed when the system detects that the user has become interested in a particular area of the display. The system detects this condition by recognizing that the user's gaze has been limited to a particular region of the displayable area 209 for a period of time.

Figure 3:
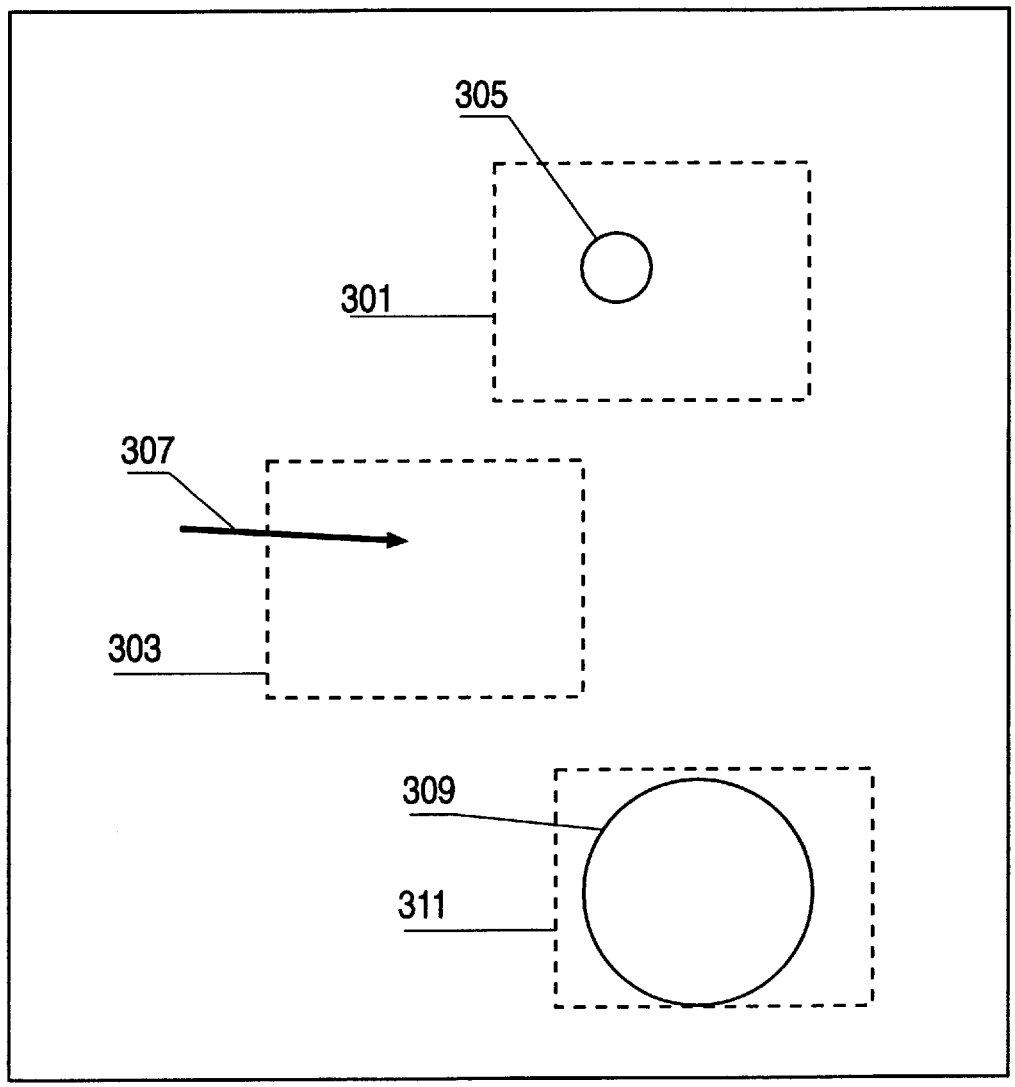
FIG. 3 illustrates aspects of a gaze position in accordance with a preferred embodiment.

FIG. 3 illustrates aspects of a gaze position determined from gaze coordinates returned from a gaze tracking device. The dashed rectangle labeled as 301 indicates the boundaries of an image (not shown). Because the gaze tracking device has an uncertainty and because the user's gaze constantly moves (because of involuntary eye movements) even when focused on an area of interest, this embodiment of the invention provides the gaze position as an area 305 where the user's gaze is fixed. The provided area 305 indicates that the user's gaze did not leave the specified area for a given time such as a half second. The application program that uses the returned circular area 305 is able to determine that the user's gaze is well within the image 301 because the provided circle is completely contained within the area of the image. If the user has interest in the entire image, the gaze would be more diffused resulting in a larger circle. For example, in comparing the image labeled 301 with an image 311, the user viewing the image 301 has focused in on a particular aspect of the image as indicated by the circle labeled as 305. The user viewing the image 311 has indicated more interest in the totality of the image as compared to a particular aspect of the image as indicated by the circle labeled as 309. One skilled in the art will understand that a rectangle or other area indication can be used as well as a circle.

In another embodiment of the invention, the gaze tracker returns the gaze position as a point. For example, a dashed rectangle labeled as 303 indicates the boundaries of a different image (again this image is not shown). In this embodiment, the gaze tracker, after processing gaze movements over some period of time, simply returns a point that is a time weighted average of the position of the gaze. This point is indicated by the arrow labeled as 307.

Figure 4:
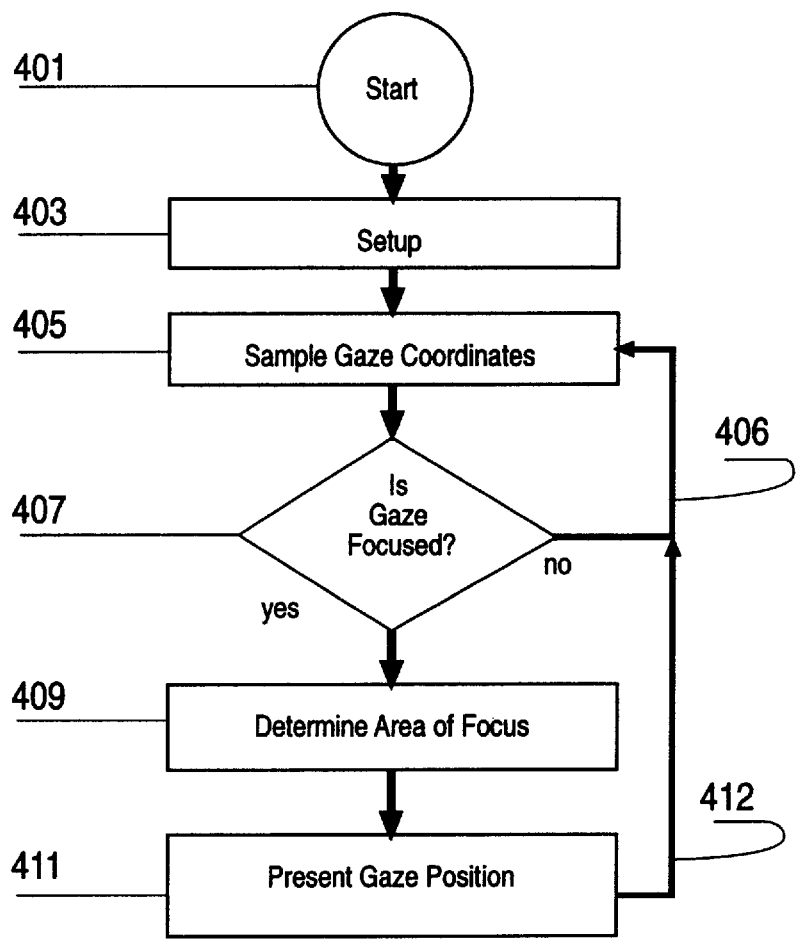
FIG. 4 illustrates the process for determining a gaze position as used in accordance with a preferred embodiment.

FIG. 4 illustrates the process used to develop a gaze position from a plurality of gaze coordinates. The process starts at a terminal 401. Next at a step 403, the process performs any necessary setup or initialization steps. This includes initializing timer program logic to periodically gather instantaneous gaze coordinate data from the gaze tracker apparatus, acquiring user preference data and other one-time initializations. Next at a step 405, the process receives a plurality of gaze coordinates (raw). These gaze coordinates (raw) indicate the position of the user's gaze over a given time. After a sufficient number of gaze coordinates (raw) are gathered, the process examines the gaze coordinates (raw) for a focus pattern at a branch point 407. A focus pattern occurs when the gaze coordinates (raw) are all within some boundary without gaze coordinates (raw) being statistically far from the others. If the gaze coordinates (raw) do not show a focused gaze, the gathering of instantaneous gaze coordinates (raw) continues as shown by an arrow 406. If at the branch point 407 a focus pattern is found then a step 409 determines an area of focus that contains the statistically significant gaze coordinates (raw). Finally, in a step 411 the gaze position is made available to the program logic for use. Finally, the process repeats as shown by an arrow 412. In the case where the gaze position is presented as an area instead of a simple coordinate pair, the receiving program logic determines which view is overlapped by the gaze position.

There are various well known methods in the art to present the gaze position to program logic such as an application program. These include providing an exception to an application, sending an interprogram message containing the gaze position to the application and many other methods.

An executing computer program can modify its operation to best suit the user's interest by using a gaze tracking device to determine which area of a display screen is the object of a user's attention. Specific embodiments using this capability of the gaze tracker are described below.

Gaze Tracker Mediated Downloading

As mentioned above, prior art communication programs such as WWW browsers and other data transfer programs that provide multiple data streams do not allocate bandwidth depending on the user's specific interest. At best, these programs will allocate bandwidth to images and data that is presented to the user on the display device. The invention enables a computer to detect which data stream the user is interested in and to allocate more bandwidth to that data stream without an explicit command from the user.

Figure 5:
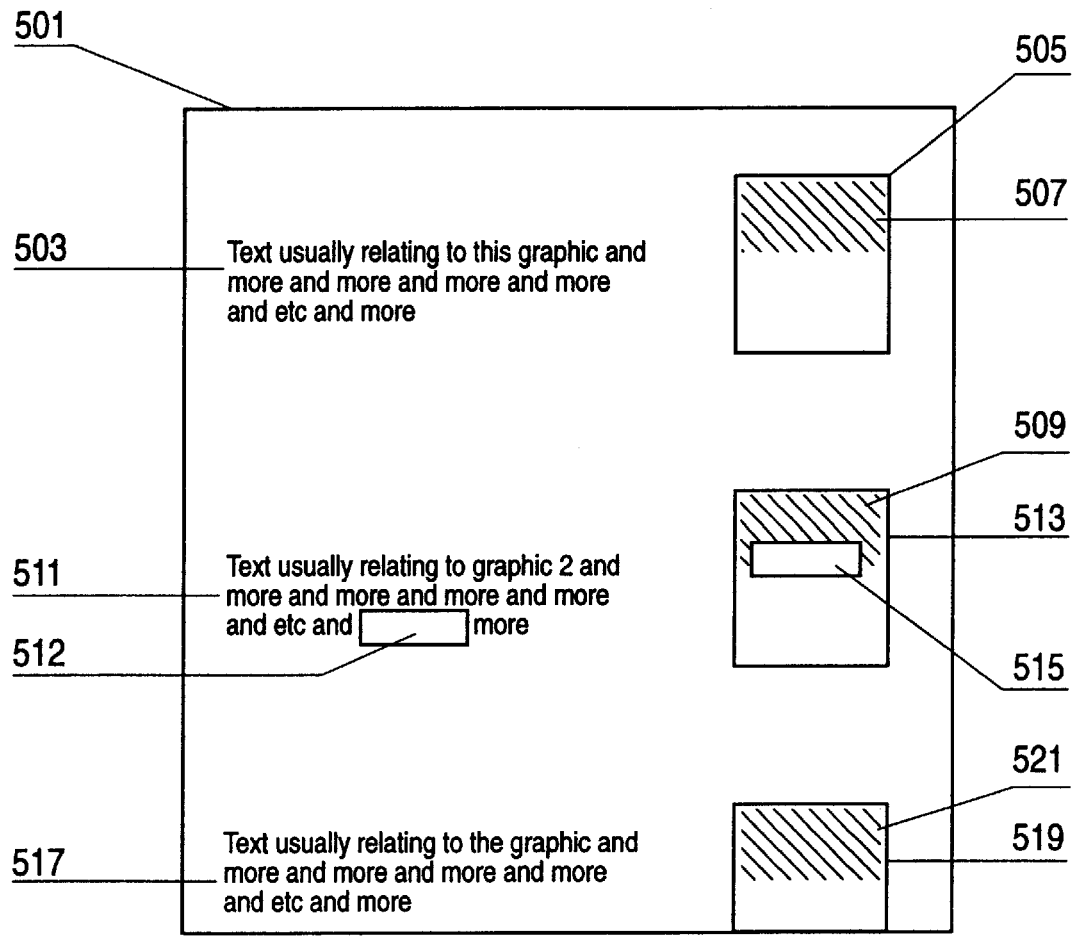
FIG. 5 illustrates the operation of the invention to allocate bandwidth to an area of interest in accordance with a preferred embodiment.

FIG. 5 illustrates how a preferred embodiment of the invention is used in a WWW browser. The browser application displays a window 501 on the display device. The user invokes a URL to present a webpage containing information encoded in HTML in the window 501. In this particular example, the webpage shows a plurality of three areas of text 503, 511 and 517 along with a plurality of areas of images 505, 513 and 519. Each of these images are displayed in a view. Further, these images are constructed from "large data entities". Each large date entity is composed of a large amount of data that is used to define the entity. Examples of large data entities, among others, are high resolution graphical images, sound and video entities. A plurality of shaded areas 507, 509 and 521 of the images 505, 513 and 519 indicate the amount of the image that has been downloaded at some particular point in time prior to completion. If the user is interested in the image labeled as 513, the user will watch that image 513 fill. Thus, a gaze position area 515 intersects the image 513 thus identifying the image 513 as an area of interest. A complementary approach to determining which image 505, 513 or 519 is of interest is to have the text 503, 511 or 517 associated with each image. Thus, when the user reads the text 511 linked (associated) with an image 513 a gaze position 512 is found on the text. Once the user shows interest in the text, the application can properly assume that the area of interest is the linked image 513.

Once the area of interest is determined, the system obtains the bandwidth allocated to the area of interest and, if possible, increases the bandwidth allocation of the data stream directed to the area of interest using techniques well understood in the art.

Figure 6:
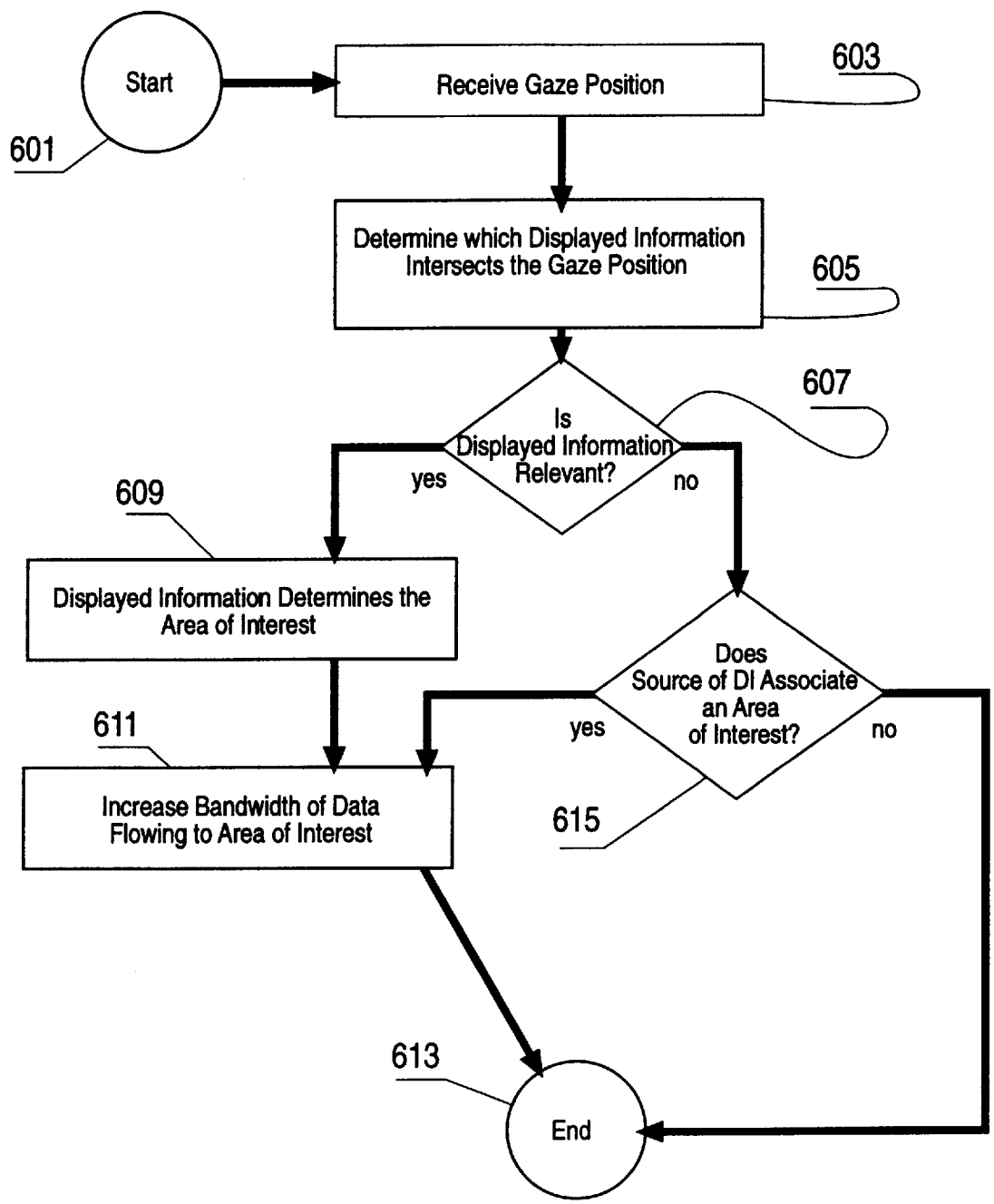
FIG. 6 illustrates the process used to change the bandwidth of a data stream based upon a gaze position in accordance with a preferred embodiment.

FIG. 6 illustrates the process used to allocate bandwidth to a data stream supplying data to an area of interest. The process starts at a terminal 601. At a step 603 the process receives the gaze position from a gaze tracking device as described above. Then at a step 605 the gaze position is used to determine what information or view on the display device intersects with the gaze position. Next in a decision block step 607, the process checks whether the displayed information that intersects the gaze position is relevant. Information that is relevant comprises information that is in the process of being transferred to the display device. In other words, a completely loaded image is not relevant and has no bandwidth allocation because there is no need to increase the bandwidth for an image that has been completely transmitted. Contrast this situation where there is zero bandwidth allocated to a yet-to-be-loaded image. Here the yet-to-be-loaded image has a bandwidth allocation, but the current allocation is zero whereas there is no bandwidth allocation at all for an image that has been completely downloaded. Text is another example of displayed information that usually is not relevant because the user cannot read the text as fast as it is transmitted even with limited bandwidth.

If in the decision block step 607 the displayed information is relevant then, in a step 609 the process determines the area of interest on the display and in a step 611 increases the bandwidth allocated to the data flow associated with the area of interest. Finally, the process completes through a terminal 613.

However, if in the decision block step 607 the displayed information is not relevant, the source of the displayed information is checked in a decision block step 615 to determine whether the source indicates that the displayed information is associated with an area of interest. An example of this situation is where text is associated with an image. If at the decision block step 615 the source is not associated with an area of interest processing completes through the terminal labeled as 613. However, if 615 the source is associated with an area of interest, the process 611 increases the bandwidth of data flowing to that area of interest. Finally, the process completes through the terminal 613.

In a preferred embodiment of a WWW browser, the process illustrated in FIG. 6 determines what area of the display device the user is interested in. If that area is a partially downloaded image, the invention increases the bandwidth allocated to the data flow for completing the image. If the area is a textual area whose defining source HTML provides an association with an image (for example, by providing an attribute within the paragraph element that associates a large data entity with the paragraph) the invention increases the bandwidth allocated to the data flow for completing that specific image.

Finally, embodiments utilizing the invention are not limited to WWW browsers. Any application that presents information that is downloaded across a limited bandwidth network onto a display device can use the invention. This includes detecting interest on data transfer status displays generated by programs such as, among others, FTP, Kermit, or x- y- and zmodem applications.

Captioning

Another preferred embodiment of the invention relates to captioning of images. Audio captioning detects the user's interest in a displayed image and automatically provides additional audio information to the user about the displayed image while video captioning provides additional video information.

Figure 7A:
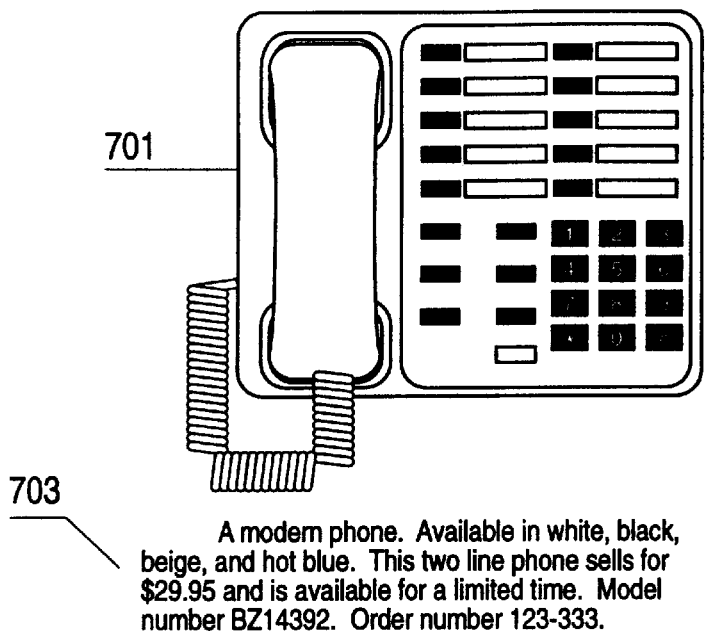
FIGS. 7A & 7B illustrate audio captioning in accordance with a preferred embodiment.

FIG. 7a illustrates captioning. An image of a phone 701 is displayed to the user. If the user is interested in the phone, the user looks at the image 701 thus generating a gaze position from the gaze tracking device. The invention then presents additional information about the phone to the user. In some circumstances, the additional information is electronic information attached to the image by a data structure within the underlying application such as the one shown in FIG. 7b. Such additional information may include text, text that is converted to audio, recorded audio data, video data, or another image.

In other circumstances the additional information is a textual caption 703 displayed with the image 701 but without a direct electronic linkage to the captioned image 701. When the additional information is a displayed textual caption 703, the invention detects that a textual caption 703 exists for the image 701, extracts that textual caption 703 and passes the extracted text string to a text-to-speech process that presents the caption text to the user in audio form. Some page markup languages support a <CAPTION> tag. For example, both SGML and HTML support such a tag (note however, that although HTML supports a <CAPTION> tag, it is currently only used for table captions and not for figures). Thus one of the preferred embodiments of the invention uses the <CAPTION> tag to detect the textual caption 703 of an image 701.

All of these methods provide additional information to the user about an image-of-interest. The audio methods allow the user to maintain his/her attention on the image while receiving additional information auditorally. Many of the other methods of presenting the additional information result in the user removing her/his gaze from the image-of-interest.

Figure 7B:
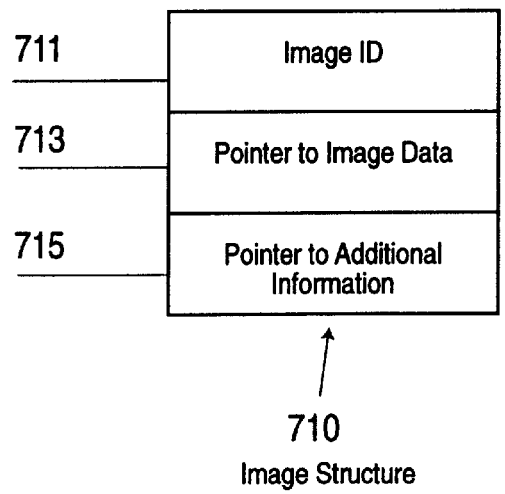

FIG. 7b illustrates a representative data structure 710 that can be used to associate additional electronic information with an image as mentioned above. An "Image ID" field 711 identifies the image displayed to the user. A "Pointer to Image Data" field 713 contains the image data, or data that directly or indirectly references the image data used to create the displayed image 701. A "Pointer to Additional Information" field 715 contains the additional electronic information data, or data that directly or indirectly references the additional electronic information data. This data structure is one of many that can be used by programmed applications that provide an explicit link between an image and additional information. Some programmed applications do not provide such an explicit linkage.

Figure 8:
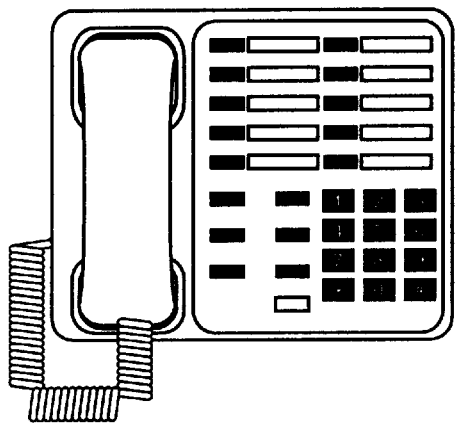
FIG. 8 illustrates extraction of an image caption from a page of text in accordance with a preferred embodiment.

FIG. 8 illustrates a window 801 displaying an example page 803. The page 803 includes text and an image 805 of a phone. The phone image 805 has an associated textual caption 807. The image 805 and the caption 807 are offset from the text by a plurality of blank areas 809, 811 and 813. These blank areas 809, 811, 813 delimit the image 805 and its associated textual caption 807 from the rest of the displayed text. This separation allows the underlying application program to determine a linkage between the image and its associated textual caption. Further, even if the underlying programmed application that presented the window 801 does not have the facility to directly determine the link between the caption 807 and the image 805, other programmed applications can scan the window 801. After scanning the window these programmed applications then isolate and pass the caption text 807 through a text-to-speech facility to convert the caption text 807 to audio and present the audio to the user.

Figure 9:
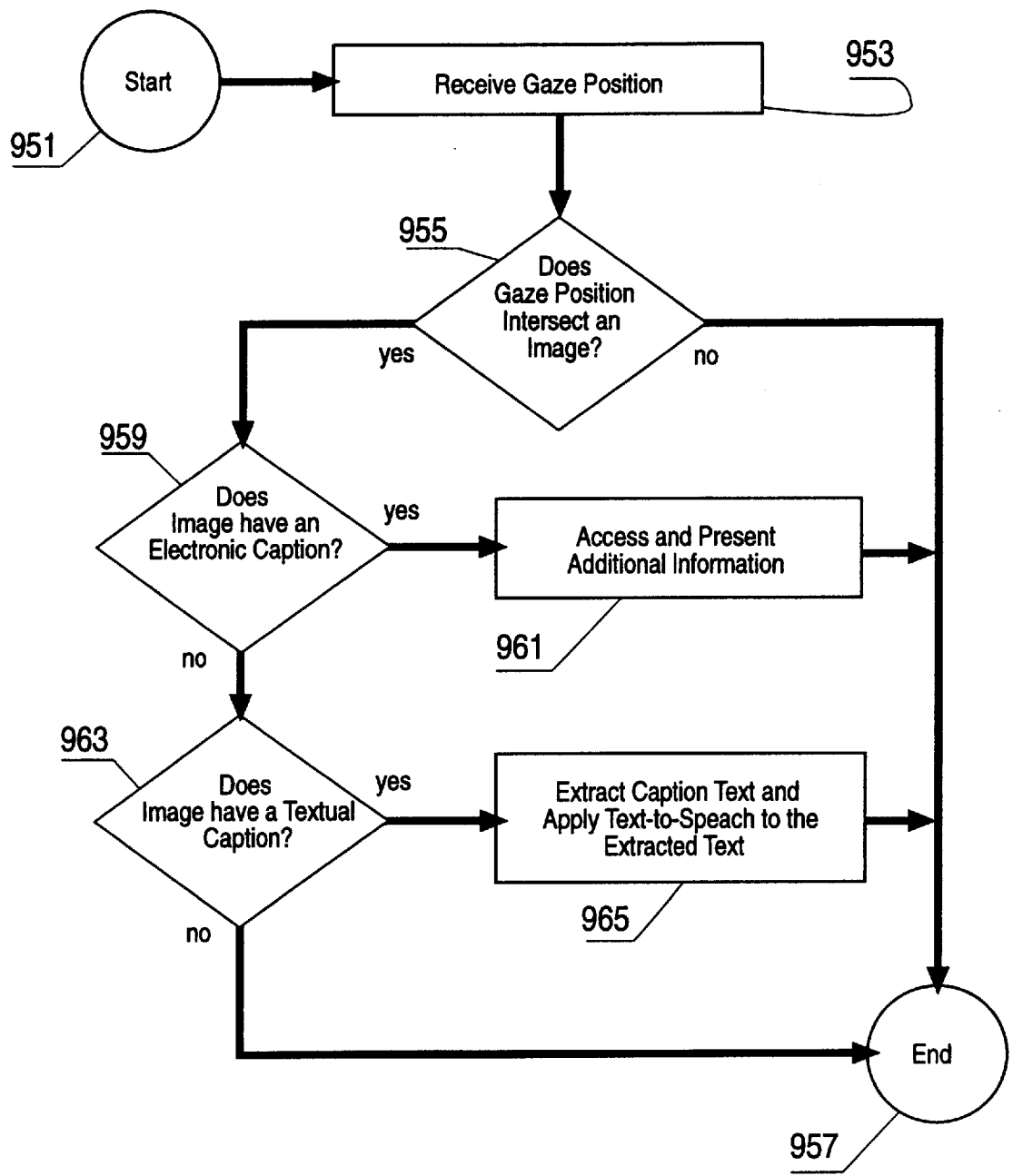
FIG. 9 illustrates the process used to implement captioning in accordance with a preferred embodiment.

FIG. 9 illustrates the process used to present additional information. The process starts at a terminal 951 when it receives a gaze position from a gaze-tracking device at a step 953. If at a decision block step 955 the gaze position does not intersect an image, the process completes through a terminal 957. If at the decision block step 955 the gaze position intersects an image and if at a decision block step 959 the image has an electronic caption, the process accesses and presents the additional information at a step 961. Finally, the process completes through the terminal 957. If at the decision block step 959 the image does not have an electronic caption but does have a displayed textual caption as determined in a decision block step 963, the process extracts the caption text and passes the resulting text string to a text-to-speech facility for auditory presentation to the user in a step 965. Finally, the process completes through the terminal 957. If in the decision block step 963 the image does not have a textual caption, or if such a caption cannot be determined, the process completes through the terminal 957.

One skilled in the art will understand that auditory presentation of the additional information to the user is accomplished with techniques known in the prior art.

Displayed Text Enlargement

Figure 10:
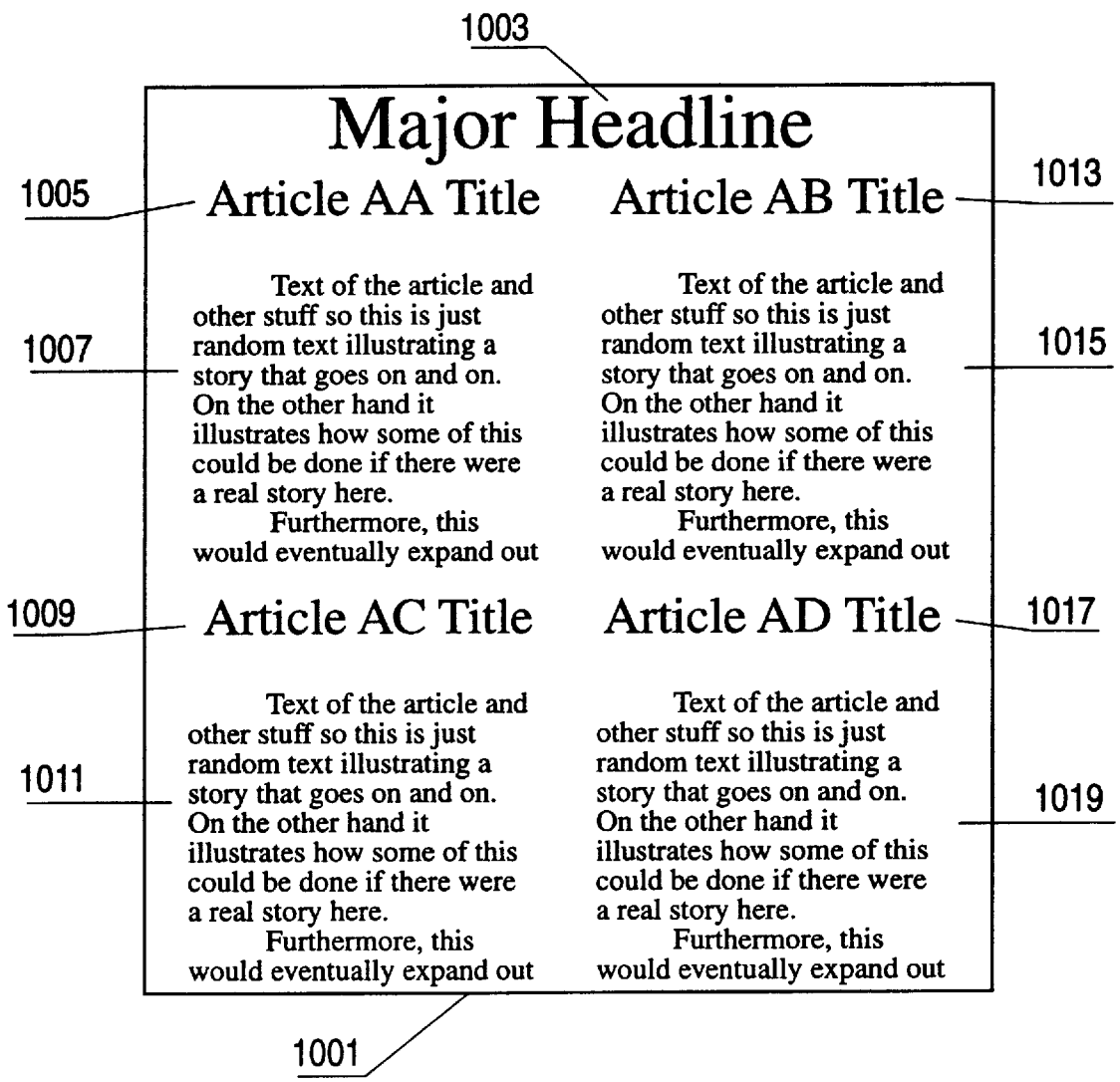
FIG. 10 illustrates the form of an electronic newspaper.

A page from an electronic newspaper is illustrated in FIG. 10. This information is displayed on a computer display screen generally in a window as discussed above. Here a window 1001 contains a headline 1003, a plurality of four article titles 1005, 1009, 1013 and 1017 and a partial text 1007, 1011, 1015, and 1019 of the titled articles. A computer for displaying the electronic newspaper that is equipped with a gaze tracking device can rely on the normal reading pattern of a user. That is, that the user first reads the major headline 1003, then the article title 1005, 1009, 1013 or 1017 followed by the article itself 1007, 1011, 1015, or 1019. Thus, when the gaze tracker indicates that the user is reading an article title, the invention starts expanding the article text by a magnification factor to an optimal size for the user.

Figure 11:
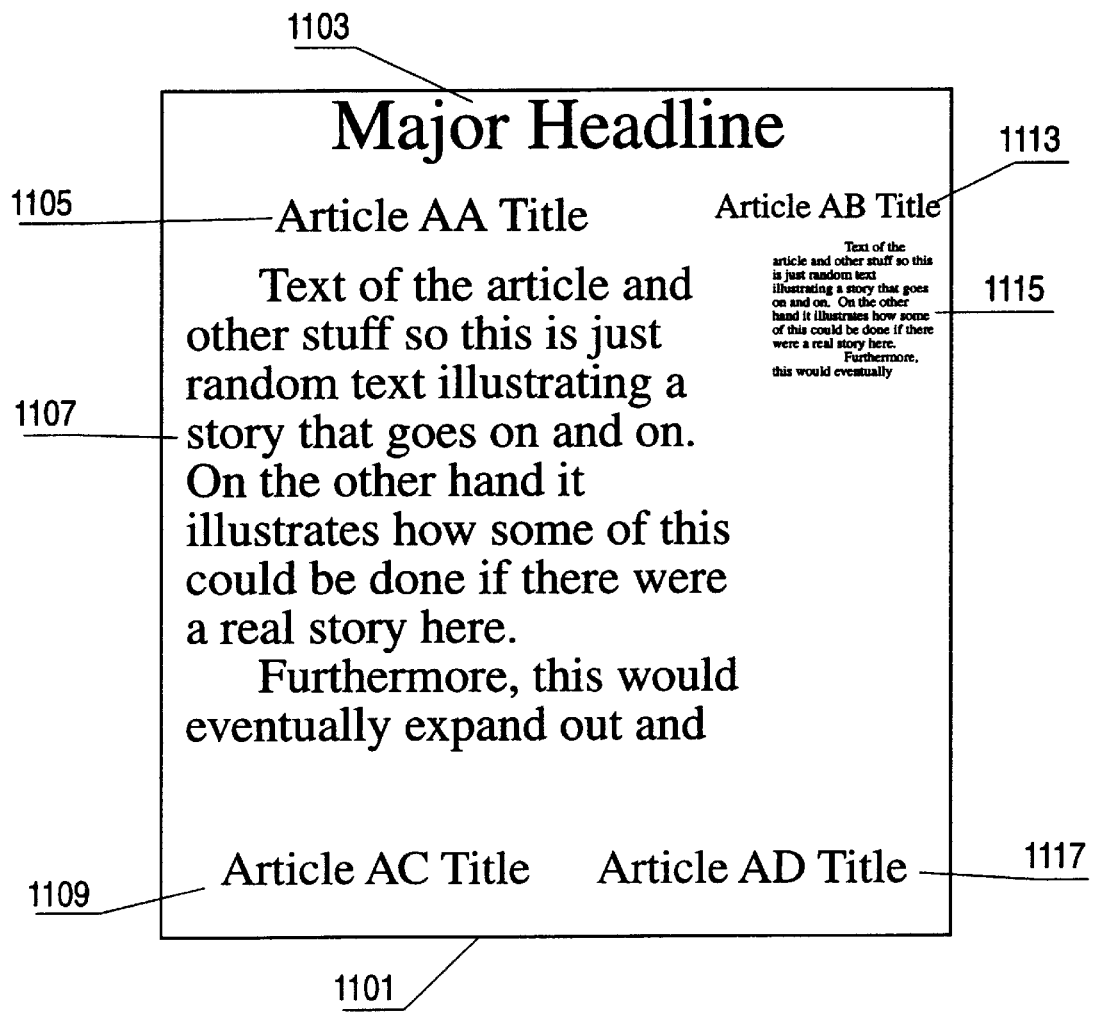
FIG. 11 illustrates text magnification and page layout in accordance with a preferred embodiment.

FIG. 11 illustrates two possible embodiments of the invention. As in FIG. 10 within a window 1101, a plurality of four article titles 1105, 1109, 1113, 1117 are displayed. The window 1101 also includes a headline 1103. An article 1107 has been expanded by the invention to a comfortable size for reading. This expansion has occurred without increasing the size of the window 1101 within which the article 1107 is displayed. However, the view containing the article 1107 and the text of the article 1107 have been expanded. To obtain the necessary window space to expand the view containing the article 1107 without interfering with the expanded view 1107, the view containing an article 1115 along with its title 1113 have been reduced in size and shifted towards the edge of the window 1101. The articles associated with the titles 1109 and 1117 have been shifted completely off of the window 1101 leaving only their associated titles 1109 and 1117.

If the computer detects that the user's gaze has moved from the expanded article 1107, to a different title 1113, 1109, or 1117, the text of the associated article is expanded. At the same time, the text and title of the previously expanded article 1105, 1107 is slowly reduced so that the user's gaze is not attracted by the apparent movement caused by the reduction. In a preferred embodiment of the invention the user may utilize computer commands to cause the reduction and expansion of the articles and their associated title to be instantaneous. Further, the expansion can be to a predetermined user preference. Finally, the expansion of the article can be dynamically determined by monitoring the user's reading speed of the article (by determining how the gaze position changes over time) so as to maximize the reading speed.

Another embodiment of the invention retains the original size of the view, but magnifies the text within the view by a magnification factor. This embodiment does not require the reduction and repositioning of the other articles as does the preferred embodiment. However, as the text expands within the limited bounds of the view the amount of text that can be displayed in the unmagnified view is reduced. Further, the maximum magnification of the text is limited in that the essential structure of the left to right reading pattern (for Latin based languages) should be retained for comfortable reading. Too much magnification of the text within a limited space results in a column of words that is difficult to read.

Figure 12:
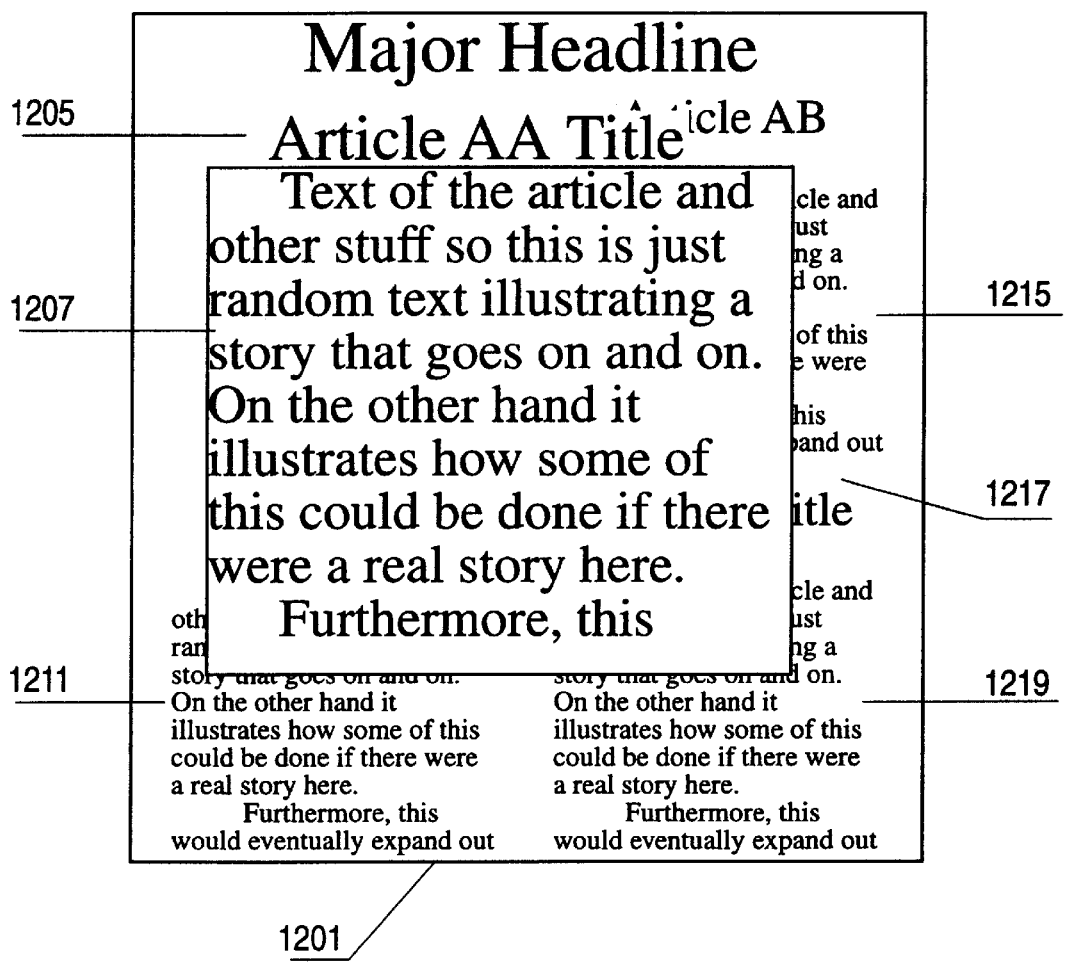
FIG. 12 illustrates text magnification and page layout in accordance with a second preferred embodiment.

FIG. 12 illustrates another approach to managing the information displayed in a window 1201. Here, a title 1205 and text of an article AA 1207 is expanded and simply overlays a plurality of other articles 1211, 1215, and 1219 in the window 1201. Because the other articles and titles are obscured, the text is reduced when the user's gaze leaves the window 1201 or when the user invokes a command function either by use of a pointing device, a command line or other command invocation method. Because the magnified view overlays the other views, a preferred embodiment places the magnified view within a boarder 1217 to separate the magnified view from the other views.

Figure 13:
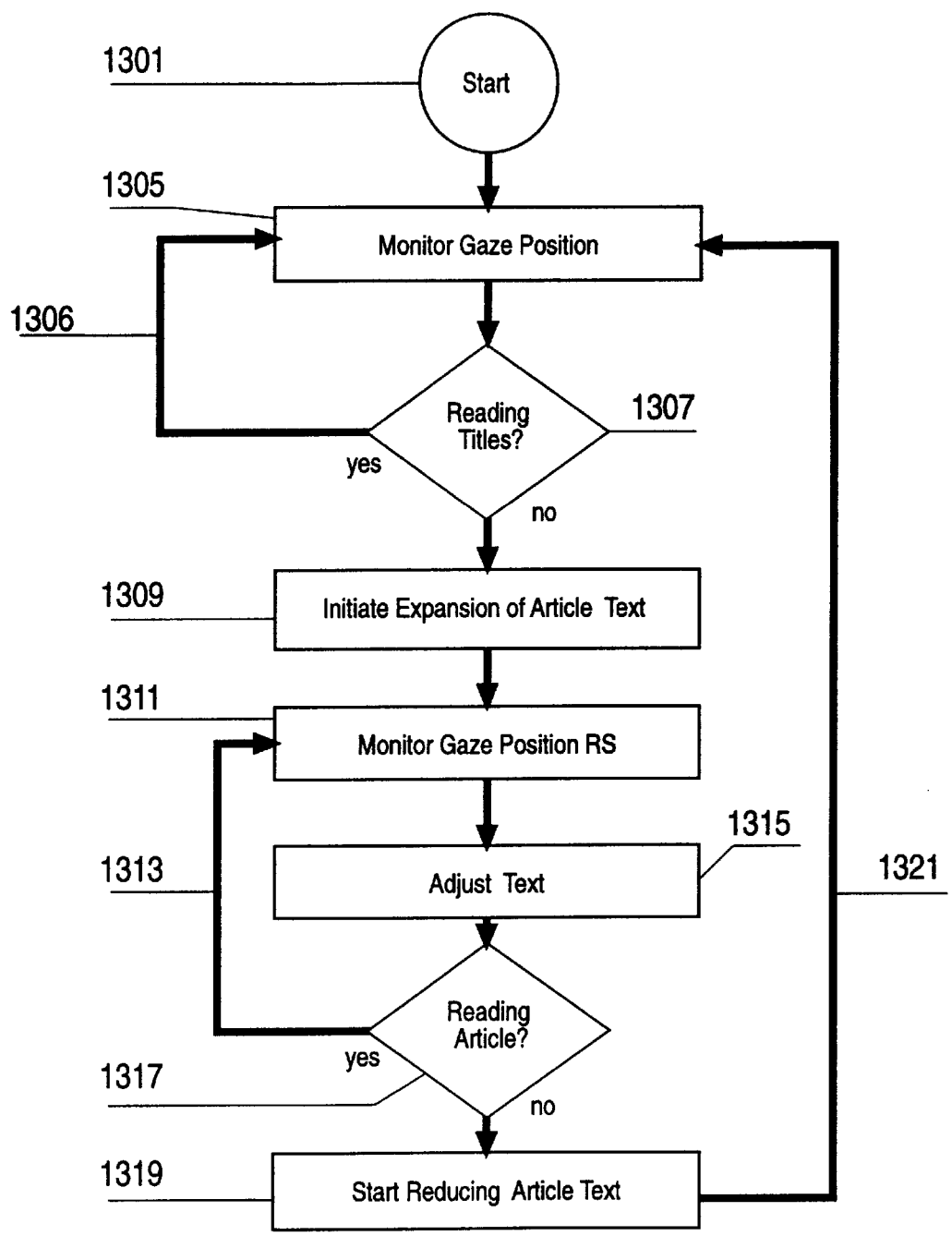
FIG. 13 illustrates the process of expanding text in response to the users interest in the text in accordance with a preferred embodiment.

FIG. 13 illustrates the process used to determine when to expand an article. The following description references FIG. 10 as an illustrative example. The process starts at a terminal 1301. At this time the user's gaze has not focused in on a window 1001. When the user's gaze enters the window 1001, the process, at a step 1305, monitors which text is read by the user. So long as the gaze position indicates that the user is reading one of the plurality of titles 1005, 1009, 1013, and 1017 as determined by a decision block step 1307 the monitoring step 1305 continues as indicated by an arrow 1306. If the decision block step 1307 detects that the user's gaze changed to a subtitle or the plurality of article text 1007, 1011, 1015, 1019, the process starts to expand the view and text of the contained article at a step 1309. The process continues to monitor the user's gaze position at a step 1311 to determine the user's reading speed. Next at a step 1315, the process adjusts the size of the article text to maximize the user's reading speed possibly continuing the expansion of the view started in the step 1311. This adjustment uses a magnification factor having a value that is a function of the reading speed. This magnification factor controls the view and the text within the view. Finally at a decision block 1317, the process determines whether the user's gaze position continues to intersect the view containing the article (that is, to verify that the user continues to read the article). If at the decision block 1317 the user continues to read the article, the monitoring process of the step 1311 continues as indicated by an arrow 1313. However if at the decision block 1317, the user has stopped reading the article, the process starts reducing the size of the abandoned article at a step 1319 and the entire process is repeated as indicated by an arrow 1321. The invention allows the user to reacquire the abandoned article simply by bringing the user's gaze back to the text of the abandoned article. This stops the reduction of the size of the article text and restarts the expansion of the article text at the step 1309 and leading to the text adjustment step 1315.

In the enlarging and reduction steps above, the text is slowly enlarged and reduced so as not to be a distraction to the user. Thus the change in size does not attract the user's gaze from the article being read. However, the invention also provides the user with commands that accelerate these scaling processes. Further, the maximum size of an expanded article can be specified as a user preference.

Figure 14:
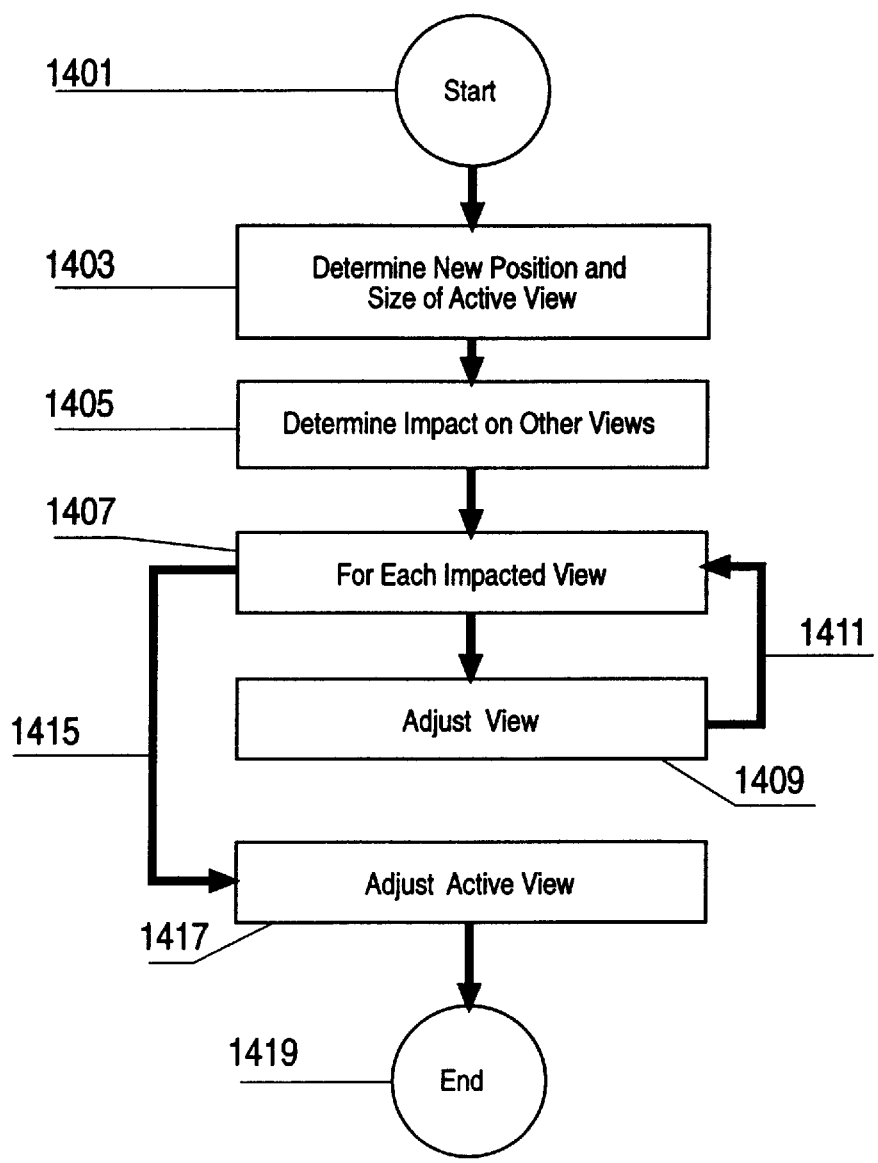
FIG. 14 illustrates the process for adjusting the layout of a display as a result of expanded text in accordance with a preferred embodiment.

FIG. 14 illustrates the process used to size the views impacted by the magnification of the view containing the article being read by the user—the active view. The process starts at a terminal 1401. At a step 1403 the process first determines the new position and size of the active view in response to the change of scale. Based on this new position and size, at a step 1405 the process determines which other views displayed in the window 1001 will be affected by the change in size and position of the active view. Then, at a step 1407, each affected view is determined and adjusted in a step 1409 to make room for the enlarged active view (where the active view is expanding), or to take up room released by a reduced active view (where the active view is contracting). This process is repeated as indicated by an arrow 1411 for each impacted view. Once the impacted views are adjusted the process continues, as indicated by an arrow 1415, to adjust the size and position of the active view in a step 1417. Finally, the process completes through a terminal 1419. Note that a reduction in the size of the active view occurs to optimize the user's reading speed. This is not the same reduction that results when the user has stopped reading a view and that view contracts because it is no longer the active view.

This aspect of the invention has been described assuming normal English reading patterns (that is, top to bottom, left to right). One skilled in the art will understand that other reading patterns are contemplated by the invention.

Interest Based Information Presentation

Figure 15:
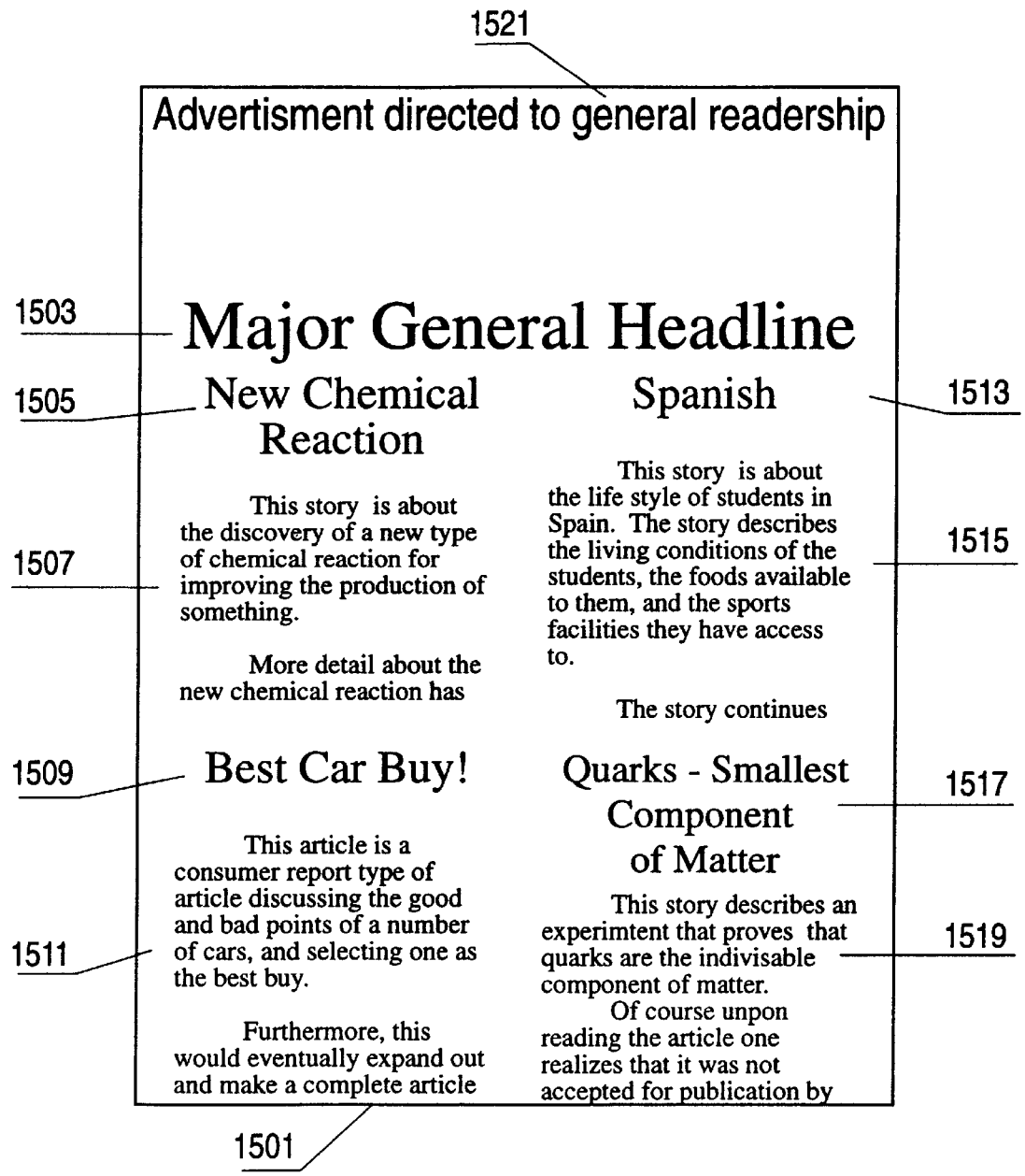
FIG. 15 illustrates a possible first page of an electronic newspaper showing articles and an advertisement in accordance with a preferred embodiment.

FIG. 15 illustrates a typical electronic newspaper display. The invention also applies to data search engine displays. Here, a number of articles 1507, 1511, 1515 and 1519 along with their associated titles 1505, 1509, 1513 and 1517 are displayed in views within a window 1501. Generally a major headline 1503 is also displayed along with a selection of advertising material 1521. Because the information provider does not know what subjects interest the user, the information provider presents a mixture of articles. Here the "New Chemical Reaction" article 1507, and the "Quarks" article 1519 are both science and technology related. The other two articles 1515 and 1511 are not. Each article and advertisement contains information that can be categorized in multiple ways. This categorization includes at least one topic classifying the information. These topics are developed and maintained by the information provider. Using gaze tracking, the information provider can determine the user's interest in each displayed article 1505, 1509, 1513 and 1517 and advertisement 1521. Then, by using the topics categorizing the presented information, the information provider can dynamically adjust the selection of subsequent information presented to this user. In the example above, suppose the user read the scientific based articles 1507 and 1519 but did not spend any time reading the other articles 1511 or 1515 or the advertisement 1521. The information provider populates the next page of information presented to the user with articles and advertisements that have similar topics as the previously read information.

FIG. 16 illustrates a possible second page of information. Again, the information is provided within views contained in a window 1601. Now a plurality of articles 1607, 1611, 1615 and 1619 are all scientific or technology based, but with different levels of difficulty extending from articles of interest to the lay reader to those that are directed toward the advanced elemental particle physicist. Further, both a Major Scientific Headline 1603 and an advertisement 1621 can be selected to be of interest to the user. This allows the information provider to narrowly target advertising and articles to each user. Again the information provider can continue to refine and narrow the selection of information presented to the user on subsequent pages depending on the interest shown in a plurality of article titles 1605, 1609, 1613, 1617, the time spent with reading each article 1607, 1611, 1615 and 1619; and the time spent looking at the advertisement 1621 of the current page.

Figure 17:
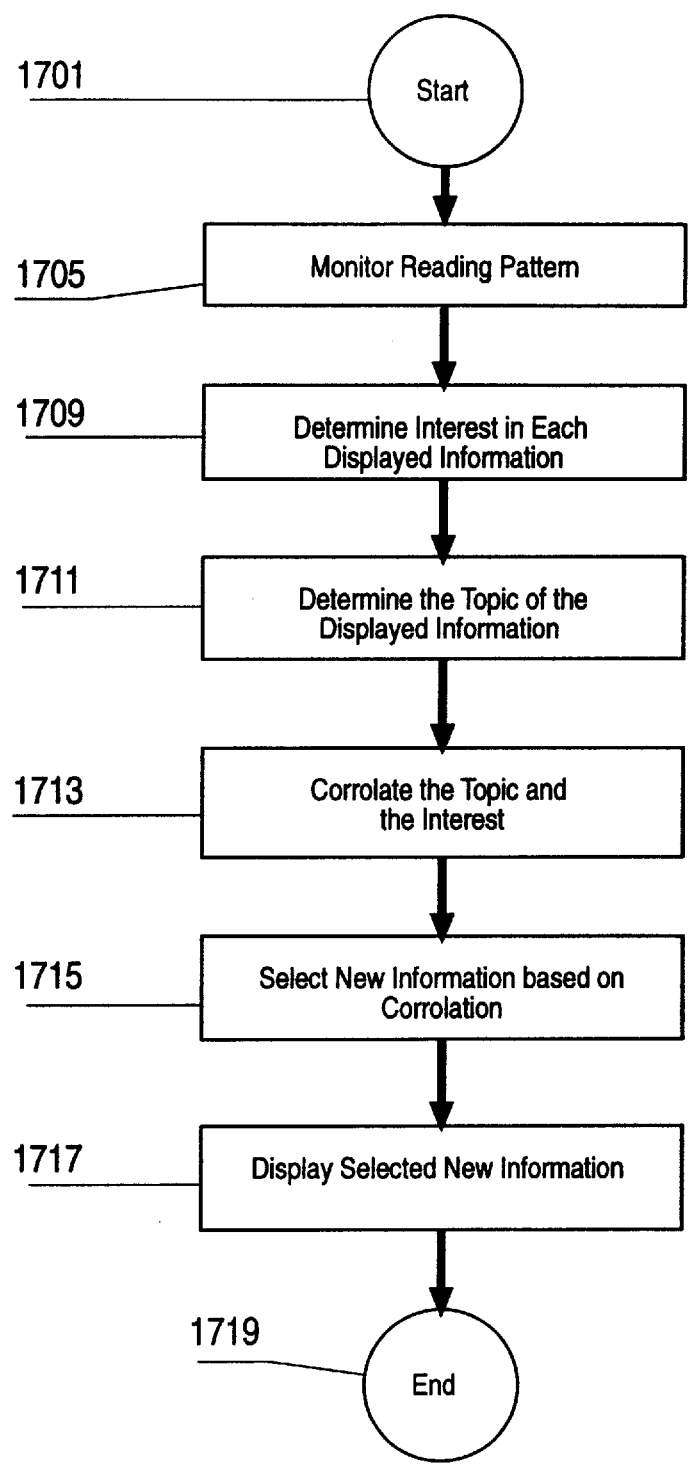
FIG. 17 illustrates the process used to evaluate the information of interest to a reader and to select new information matching the readers interest in accordance with a preferred embodiment.

FIG. 17 illustrates the process used to select information for presentation to a user.

The process starts at a terminal 1701 after an initial selection of information is displayed to the user. Using the gaze position developed as described above, a step 1705 monitors the user's reading pattern. Further a step 1709, determines the amount of interest shown by the user in the displayed information. This interest is determined by measuring the user's reading speed, determining whether the user only skimmed the information or read the information in depth, and by measuring the amount of time spent with each article and advertisement. Then in a step 1711, the process retrieves the topics associated with each displayed information and in a step 1713 correlates these topics with the user's interest. Next in a step 1715, the process selects additional information based on this correlation. This selection of information is displayed in a step 1717 for the user. Finally, the process completes through a terminal 1719. In this manner, the user is presented with a customized set of information that reflects the user's interest.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for presenting information to a user of a computer; said computer having a display device and a gaze-tracking device; said gaze-tracking device determining a gaze position on said display device; said computer controlled method comprising the steps of:

(a) displaying a plurality of articles, whose contents have been categorized by one or more topics, on said display device;

(b) monitoring said gaze position on said plurality of articles displayed to determine a level of interest of said user in each of said plurality of articles displayed, said level of interest being dependent on the time said gaze position intersects each of said plurality of articles displayed;

(c) identifying said one or more topics common to said plurality of articles having the highest level of interest to said user as determined in step (b) by determining a correlation between said one or more topics and said level of interest; and (d) selecting one or more new articles classified according to said topics identified in step (c).

2. The computer controlled method of claim 1 further comprising the steps of:

maintaining a correlation history associated with said user; and refining said correlation using said correlation history.

3. The computer controlled method of claim 1 wherein said plurality of articles includes an advertisement; and wherein step (d) further comprises the steps of:

(d1) determining an advertising correlation; and (d2) selecting a new advertisement based on said advertising correlation.

4. The computer controlled method of claim 1 further comprising the steps of:

measuring said user's reading speed for at least one of said plurality of articles; and measuring a time period when said gaze position is within a display area containing one of said plurality of articles; said time period and said reading speed comprising correlation parameters.

5. The computer controlled method of claim 4 wherein said correlation includes one or more of said correlation parameters.

6. An information presentation apparatus configured to present information to a user; said apparatus having a central processor unit, a memory, a display device, and a gaze-tracking device for determining a gaze position on said display device; said apparatus comprising:

a display mechanism configured to display a plurality of articles, whose contents have been categorized by one or more topics, on said display device;

a monitoring mechanism configured to monitor said gaze position on said plurality of articles displayed to determine a level of interest of said user in at least one of said plurality of articles displayed, said level of interest being dependent on the time said gaze position intersects each of said plurality of articles displayed;

an identification mechanism configured to identify said one or more topics common to said plurality of articles having the highest level of interest to said user as determined by the monitoring mechanism, the identification mechanism further comprising a correlation mechanism configured to determine a correlation between said one or more topics and said level of interest of said user; and a selection mechanism configured to select one or more new articles classified according to said topics identified by the identification mechanism.

7. The information presentation apparatus of claim 6 further comprising:

a history mechanism configured to maintain a correlation history associated with said user; and a refinement mechanism configured to determine a refined correlation using said correlation history.

8. The information presentation apparatus of claim 6 wherein said plurality of articles includes an advertisement; said selection mechanism further comprises:

an advertisement correlation mechanism configured to determine an advertising correlation; and an advertisement selection mechanism configured to select a new advertisement based on said advertising correlation.

9. The information presentation apparatus of claim 6 further comprising:

a reading speed measuring mechanism configured to measure said user's reading speed for at least one of said plurality of articles; and a time measuring mechanism configured to measure a time period when said gaze position is within a display area containing one of said plurality of articles; said time period and said reading speed comprising correlation parameters.

10. The information presentation apparatus of claim 9 wherein said correlation mechanism additionally uses one or more of said correlation parameters to determine said correlation.

11. An information presentation system configured to present information to a user; said system having a display device, and a gaze-tracking device for determining a gaze position on said display device; said system comprising:

a display mechanism configured to display a plurality of articles, whose contents have been categorized by one or more topics, on said display device;

a monitoring mechanism configured to monitor said gaze position on said plurality of articles displayed to determine a level of interest of said user in at least one of said plurality of articles displayed, said level of interest being dependent on the time said gaze position intersects each of said plurality of articles displayed;

an identification mechanism configured to identify said one or more topics common to said plurality of articles having the highest level of interest to said user as determined by the monitoring mechanism, the identification mechanism further comprising a correlation mechanism configured to determine a correlation between said one or more topics and said level of interest of said user; and a selection mechanism configured to select one or more new articles classified according to said topics identified by the identification mechanism.

12. The information presentation system of claim 11 further comprising:

a history mechanism configured to maintain a correlation history associated with said user; and a refinement mechanism configured to determine a refined correlation using said correlation history.

13. The information presentation system of claim 11 wherein said plurality of articles includes an advertisement; said selection mechanism further comprises:

an advertisement correlation mechanism configured to determine an advertising correlation; and an advertisement selection mechanism configured to select a new advertisement based on said advertising correlation.

14. The information presentation system of claim 11 further comprising:

a reading speed measuring mechanism configured to measure said user's reading speed for at least one of said plurality of articles; and a time measuring mechanism configured to measure a time period when said gaze position is within a display area containing one of said plurality of articles; said time period and said reading speed comprising correlation parameters.

15. The information presentation system of claim 14 wherein said correlation mechanism additionally uses one or more of said correlation parameters to determine said correlation.

16. A computer program product comprising:

(a) a computer usable storage medium having computer readable code embodied therein for causing a computer to present information to a user; said computer readable code comprising:

(b) computer readable code configured to cause said computer to effect a display mechanism configured to display a plurality of articles, whose contents have been categorized by one or more topics, on said display device;

computer readable code configured to cause said computer to effect a monitoring mechanism configured to monitor said gaze position on said plurality of articles displayed to determine a level of interest of said user in at least one of said plurality of articles displayed, said level of interest being dependent on the time said gaze position intersects each of said plurality of articles displayed;

computer readable code configured to cause said computer to effect an identification mechanism configured to identify said one or more topics common to said plurality of articles having the highest level of interest to said user as determined by the monitoring mechanism, the identification mechanism further comprising computer readable code configured to cause said computer to effect a correlation mechanism configured to determine a correlation between said one or more topics and said level of interest of said user; and computer readable code configured to cause said computer to effect a selection mechanism configured to select one or more new articles classified according to said topics identified by the identification mechanism.

17. The computer program product of claim 16 further comprising:

computer readable code configured to cause said computer to effect a history mechanism configured to maintain a correlation history associated with said user; and computer readable code configured to cause said computer to effect a refinement mechanism configured to determine a refined correlation using said correlation history.

18. The computer program product of claim 16 wherein said plurality of articles includes an advertisement;

said selection mechanism further comprises computer readable code configured to cause said computer to effect an advertisement correlation mechanism configured to determine an advertising correlation; and computer readable code configured to cause said computer to effect an advertisement selection mechanism configured to select a new advertisement based on said advertising correlation.

19. The computer program product of claim 16 further comprising:

computer readable code configured to cause said computer to effect a reading speed measuring mechanism configured to measure said user's reading speed for at least one of said plurality of articles; and computer readable code configured to cause said computer to effect a time measuring mechanism configured to measure a time period when said gaze position is within a display area containing one of said plurality of articles; said time period and said reading speed comprising correlation parameters.

20. The computer program product of claim 19 wherein said correlation mechanism additionally uses one or more of said correlation parameters to determine said correlation.

* * * * *